May 20, 1941.  P. M. G. TOULON  2,242,633
SYNCHRONIZING SYSTEM, PARTICULARLY FOR TELEVISION PURPOSES
Filed Nov. 25, 1936  5 Sheets-Sheet 1

INVENTOR
PIERRE MARIE GABRIEL TOULON
BY
Pennie, Davis, Marvin and Edmonds.
ATTORNEYS

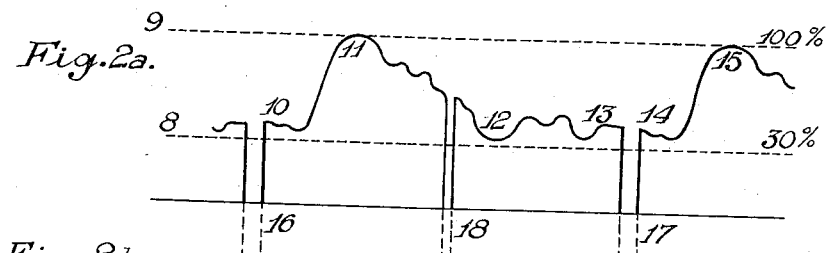
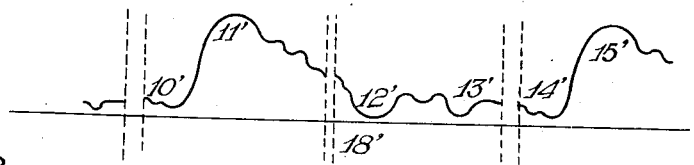
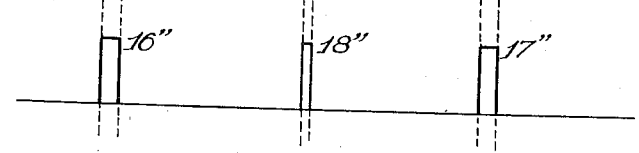
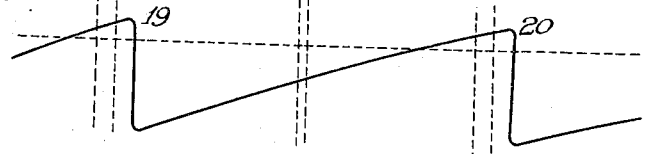
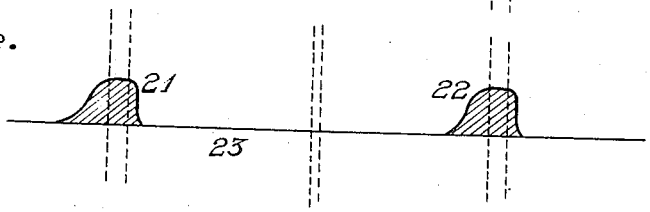
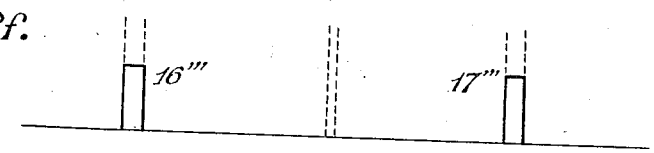

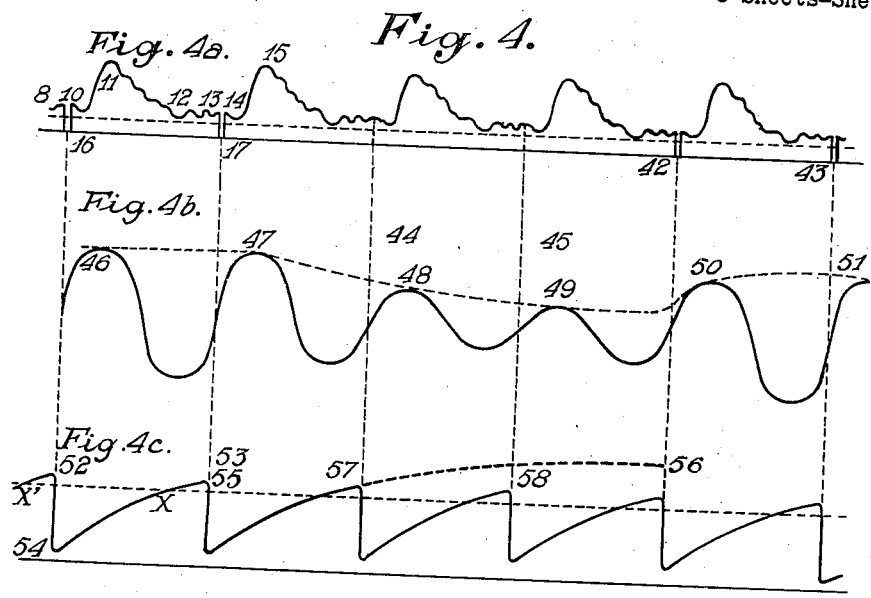
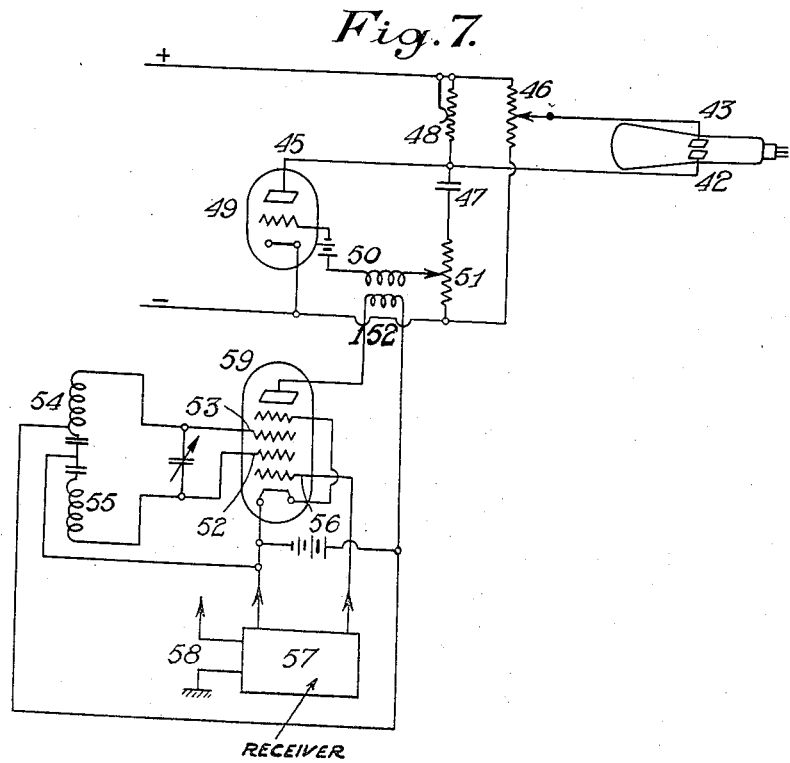

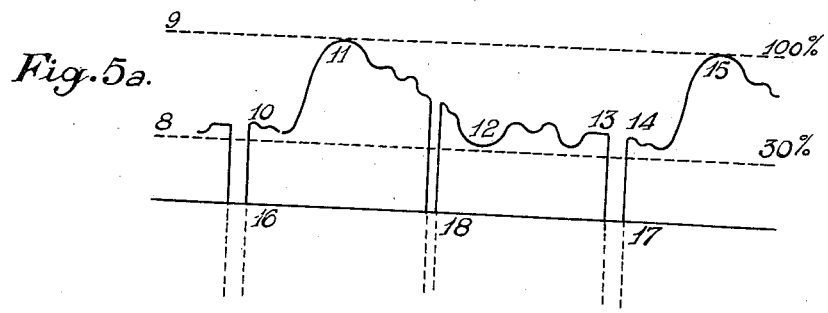
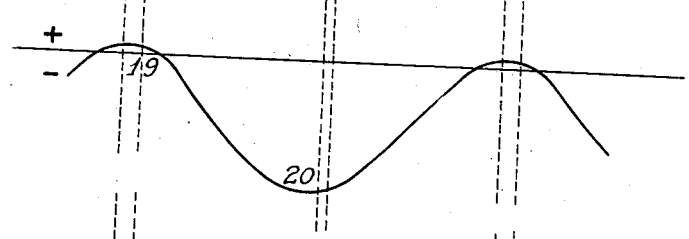
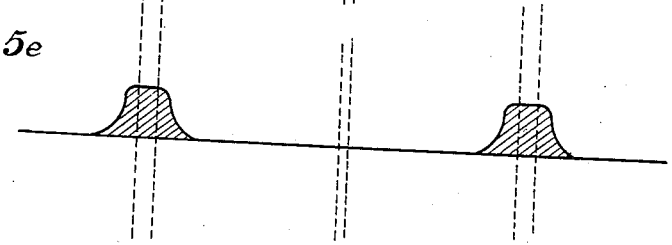
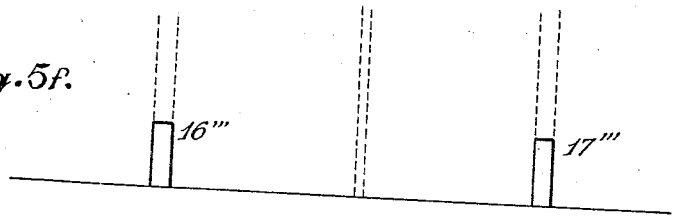

Fig. 6.
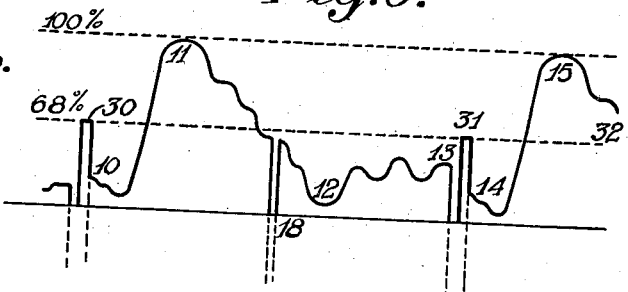
Fig. 6a.
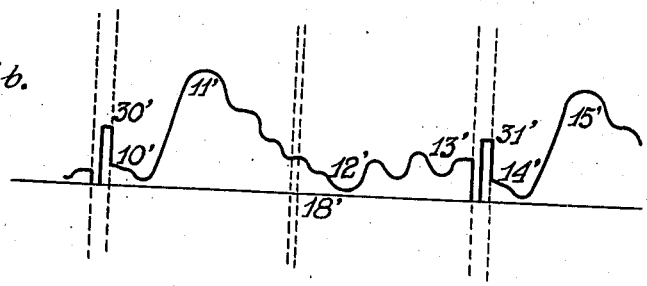
Fig. 6b.
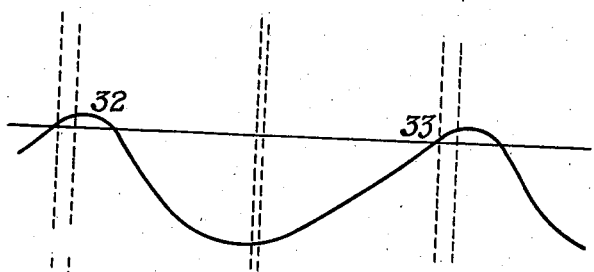
Fig. 6d.
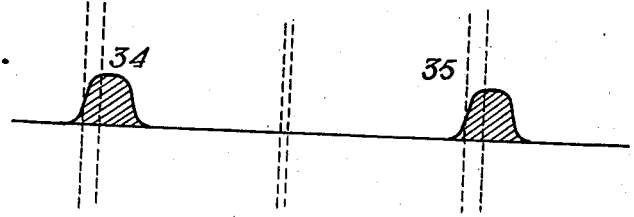
Fig. 6e.
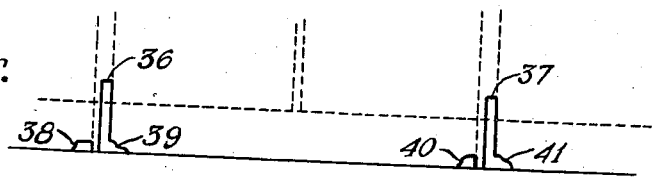
Fig. 6f.

Patented May 20, 1941

2,242,633

UNITED STATES PATENT OFFICE 2,242,633

SYNCHRONIZING SYSTEM, PARTICULARLY FOR TELEVISION PURPOSES

Pierre Marie Gabriel Toulon, Paris, France, assignor to Radio Corporation of America, New York, N. Y., a corporation of Delaware Application November 25, 1936, Serial No. 112,637
In France November 27, 1935

14 Claims. (Cl. 178—7.3)

Television receivers comprising a cathode ray tube are provided with means for scanning the tube screen. The electron stream is thereby deviated, electrostatically or electromagnetically, the deviation being controlled by a relaxation system. This system is in its turn controlled from the transmitter by means of signals. Generally a tube filled with a rarefied gas and provided with a control grid (so-called Thyratron tube) is used in this relaxation system to obtain the rapid discharge of a condenser, the same being charged slowly and progressively, so that its voltage is roughly proportional to time. This voltage is applied to the electron beam control plates. Complete suppression of the carrier is often used as the synchronizing signal; in the course of image scanning the carrier then never falls below a given value, say 30%.

With a strong and nearby transmitter this system is completely satisfactory; in practice however these conditions are not generally satisfied. Moreover the necessity of maintaining, even in the darkest portions of the image, a considerable carrier amplitude, reduces the useful degree of modulation and thereby the useful power transmitted. On the other hand parasites may produce at the receiver the actuation of the relaxation system, from which an incorrect location of the lines or of the image is liable to result.

An object of the invention is to remedy this defect; it ensures a perfectly sharp and stable image the points of which are always correctly placed, even though the synchronizing signals be strongly troubled by parasites. The reception remains perfect even if the synchronizing signals fail or are weak.

According to the invention a variable transmission system is introduced between the part receiving the modulation together with the synchronizing signals, and the discriminator which has to select the synchronizing impulses from the mixture of modulation and synchronizing signals, the variation in transmission characteristics of this system being such, that maximum transmission is periodically attained at or near the moment at which the synchronizing signal is expected. In this manner parasites received during a period in which the said system transmits badly will not be liable to actuate the synchronization circuit.

The discriminator is therefore protected against any parasites arriving at any moment other than during the periods of optimum transmission of the said system.

In an embodiment of the invention the periodic variation of the transmission characteristics is controlled by the relaxation circuit usual in television receivers, this circuit being in its turn controlled by the discriminator.

A further object of the invention is to stabilise the synchronizing action in a cathode ray receiver by means of an oscillator tuned to the synchronization frequency and introduced between the initial amplifier and the discriminator. This oscillator has a certain amount of residual damping so that it does not oscillate if left to itself, but will oscillate in harmony with an impressed voltage of its own frequency; the oscillator therefore has considerable inertia so that if one or more of the synchronizing impulses should fail to arrive or even if they should arrive incorrectly a correct synchronizing signal will be supplied to the relaxation circuit, and this will continue to function correctly.

An important feature of the invention is that it allows of the use of synchronizing signals which are substantially of the same character, as concerns their shape and amplitude, as the modulation signals. It is thereby possible to make use, at the transmitting end, of a system of modulation with a much higher efficiency than the systems possible with usual receivers.

The invention also pertains to a particular form of the variable transmission system, which makes use of a part influenced by the amplitude of the electron beam in the cathode ray tube, such part being e. g. a small plate electrostatically coupled to the screen, or cooperating in any manner with the fluorescent screen. The voltage on said part provokes the actuation of the relaxation circuit for controlling the oscillator tuned to the emitter frequency.

The invention will now be described in detail with reference to the accompanying drawings showing the principle and by way of example some forms of the invention.

Fig. 2 shows graphically the functioning of the system of Fig. 1.

Figs. 4 and 5 show graphically the functioning of the circuit of Fig. 3.

Fig. 6 represents graphically the characteristics of the modulation system according to the invention.

Fig. 7 shows a thyratron relaxation circuit acting on the deviation plates of a cathode ray tube, in which the Thyratron control grid is actuated, instead of directly by the amplifier in the usual manner, by a tuned oscillator.

These figures are only given by way of example and it is obvious that the same apparatus may be used in many other manners without departing from the spirit of the invention.

Figure 1:
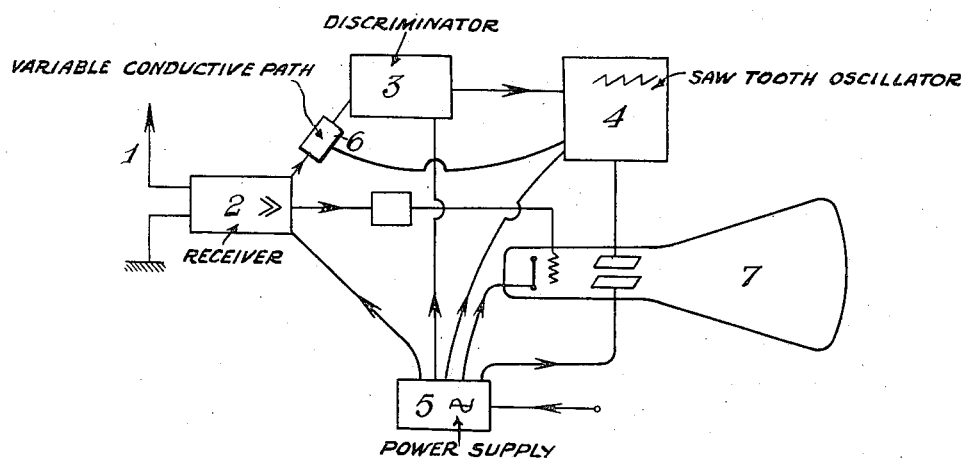
Fig. 1 shows a diagram pertaining to a receiver provided with a cathode ray tube and in which the invention has been applied.

Fig. 1 shows in full lines the usual circuit of a television receiver. In dotted lines is shown the arrangement according to the invention by which the synchronizing discriminator is rendered insensible to parasites.

The amplifier 2 is fed by the antenna 1 (generally the amplifier will be a superheterodyne having one or more frequency stages, a heterodyne stage, an intermediate frequency amplifier, a band pass filter and a rectifier). The amplifier output is connected, on the one hand, to the cathode ray control grid, and on the other hand to a suitable biased amplifying valve adapted to select the synchronizing signals, acting on either their amplitude or on their sign.

This valve controls in its turn the discharge valve (thyratron) relaxation system 4, this system provoking the potential variation of the deviation plates of the cathode ray tube 7 (the voltage at these plates as a function of time is represented by a saw tooth curve in the rectangle 4). The valves are all fed from the mains by a rectifying set 5.

According to the invention the chances of actuation of the relaxation system at undesired moments are minimised by periodically interrupting the transmission between the amplifier 2 and the discriminator 3. The perturbing influence of parasites is thereby materially reduced.

In Fig. 1 the system interrupting the passage of the signal to the discriminator has been indicated in dotted lines at 6. Use is made of the relaxation system itself for periodically interrupting the connection between the amplifier 2 and the discriminator 3.

The action of the receiver according to the invention will now be explained with reference to Fig. 2. Fig. 2a shows on a time base the value of the carrier transmitted by the emitter. This graph may also be considered as the envelope of the emitted wave.

Fig. 2b shows on a time base the value of the detected current as transmitted to the control grid of the cathode ray tube 7.

Fig. 2c shows on a time base the value of the current as detected by the discriminator 3 which selects the synchronizing signals.

Fig. 2d shows the value of the voltage applied by the relaxation system 4 to the cathode ray deflecting plates.

Fig. 2e shows the intensity of the current from the valve constituting the interrupting system 6 and ensuring the connection between the amplifier 2 and the discriminator 3, the value of this current and therefore the transmission efficiency between these two parts being controlled by the relaxation system 4.

Fig. 2f shows the synchronizing signals arriving at the relaxation system when the invention is applied.

As shown in Fig. 2a the synchronizing signals are assumed to be given by carrier interruptions, the width of useful modulation being taken as from 30–100%; the dotted line 8 corresponds to 30% modulation. A line of television image corresponds to the graph 10, 11, 12, 13, the next line corresponding to the curve 14, 15 . . . , the synchronizing signals given at the end of each line being shown as carrier suppressions at the points 16, 17. As is well known transmission disturbances may have the same effect as positive or negative signals. In the present case positive signals will not disturb synchronization, but negative signals may do so by provoking the actuation of the synchronizing system at undesired moments. At 18 such a disturbance is shown.

As shown in Fig. 2b the control of the intensity grid of the cathode ray tube is effected by means of a detector. The detected voltage is shown at 10', 11', 12' and 13', the shape of this curve corresponding to that of Fig. 2a, with this difference that points like 11 which correspond to white points come to lie at 11', whereas points like 12, corresponding to blacks, lie at 12' in the detected signal. The latter points correspond to a voltage zero. In detection the envelope is thus shifted in a vertical direction.

The synchronizing signal discriminator constituted by a suitable biased detector or diode valve is adapted to furnish synchronizing impulses whenever the degree of modulation falls below 30% (line 8 of Fig. 2a). As used in known apparatus the discriminator will transmit to the relaxation system impulses like 16", 17" and 18". Of these the impulses 16" and 17" are desired, whereas the impulse 18" is produced by a parasite and thus would risk to actuate the relaxation system at an undesired moment; the line points would thereby be deplaced in a transverse sense and the entire image would be distorted. The application of the invention will remedy this defect. Fig. 2d shows the saw tooth voltage 19—20 supplied by the relaxation system.

The interrupting system 6 provided between the amplifier 2 and the discriminator 3 preferably includes a multi-electrode valve one of the grids of which is controlled by the relaxation system 4. Fig. 2e shows the plate current due to such control by the saw tooth voltage 19—20; the straight line 23 corresponds to zero grid voltage. Plate current only flows when the grid voltage is sufficiently positive, as occurs at the points 21 and 22. At all other time points strong negative grid voltages prevent the flow of plate current. Another grid of the valve in question receives the signals from the amplifier 2. When synchronizing impulses arrive during the intervals that plate current flows, like at 21 or 22, the impulse is transmitted: 16" and 17" of Fig. 2f. If however an impulse arrives in the interval between 21 and 22 it will not not be transmitted, because the valve is blocked. This will in particular be the case for the parasite 18 which will thus be prevented from reaching the discriminator. A comparison of the curves 2f and 2c will clearly reveal the importance of the invention.

Figure 3:
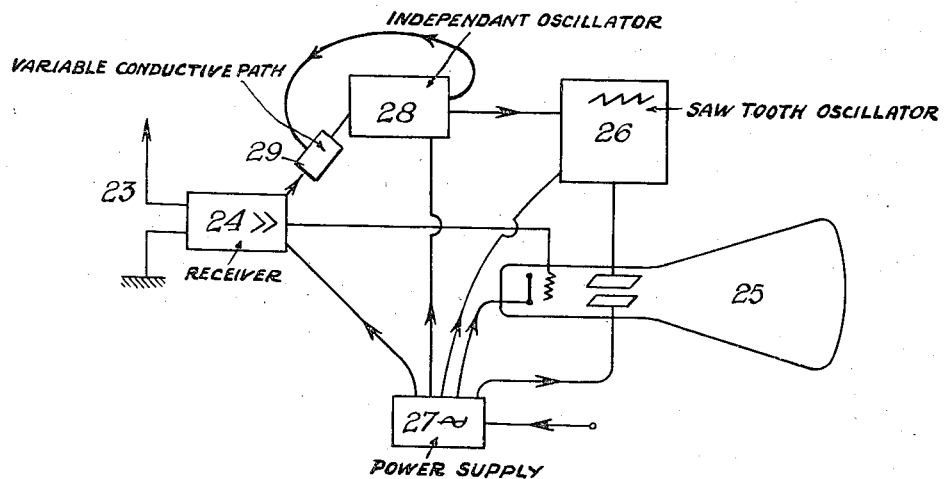
Fig. 3 shows diagrammatically a modification provided with a synchronizing oscillator as described in the above.

The invention may yet be perfected by providing an oscillator system between the amplifier and the relaxation system, as shown in Fig. 3. The provision of such oscillator will have very considerable advantages in stabilizing the action of the relaxation system; it will ensure the actuation of this system even if the synchronizing signal has not been transmitted, or even if it has been incorrectly transmitted. Fig. 3 shows at 23 the antenna, at 24 the amplifier, at 25 the cathode ray tube, at 26 the relaxation system and at 27 the mains-fed rectifier. According to the invention an oscillator 28 is provided which has a period very close to that of the synchronizing signals. The periodic transmission of the synchronizing signal has for its effect to actuate the oscillator, that is to say, to modify its period very slightly and bring it into step with the received synchronization frequency; if the signals arrive early they will tend to slightly increase the oscillator frequency, and if on the contrary they arrive late they will tend to reduce that frequency.

The action of this oscillator is illustrated on a time base in the curves of Fig. 4. As in a former figure curve 4a represents the envelope of the carrier 6, 10, 11, 12, 13, 14, 15, etc., interrupted by the synchronizing impulses 16, 17, 42, 43. As will be seen from the figure the synchronizing impulses which would have had to arrive at the moments 44 and 45, fail (due to fading or any other effect). Curve 46 represents the oscillations of the tuned oscillator. As long as it receives regularly the impulses (16, 17) its amplitude remains constant (46, 47). If the impulses fail the amplitude begins to fall according to an exponential law (dotted line 47, 48, 49); due to the very low damping of the system the oscillations continue for a long time after the last synchronizing impulse, and remain of substantially the same frequency. On the reappearance of the synchronizing signal the oscillator gradually regains its normal oscillation amplitude (50—51).

As shown in Fig. 3 the oscillator controls the relaxation system; in particular, according to a preferred system, the oscillator voltage will act on the control grid of a Thyratron combined with a condenser according to the well-known manner. As soon as the grid becomes positive the Thyratron discharges the condenser; its plate voltage, and consequently the condenser voltage, falls to a very low value 54 (curve 4c representing the Thyratron plate voltage as a function of time). The instants at which discharge occurs are shown at 52 and 53. In the intervals 54—53 the condenser is recharged and the plate voltage rises; nevertheless as long as it does not reach a certain value 55 the positive grid polarisation corresponding to the positive wave half 46 of the oscillator, will not suffice to provoke the discharge. As a result the next discharge can only occur at the moment 53. In the absence of the tuned oscillator and in the interval 44—45 corresponding to the failure of the synchronizing signals the condenser would have continued its charge (dotted curve 57—56) till the arrival of the next synchronizing signal, i. e. till the moment 56. In other words the entire action of the synchronization system would be disturbed. Thanks to the use of the oscillator its action will continue to be correct. The oscillations 48 and 49 supply signals replacing the failing synchronizing signals and rendering positive the Thyratron grid at the required moments 57 and 58, so that it discharges correctly. It will be evident that an analogous regulating action will be exercised by the oscillator in the case of a displacement or attenuation of the synchronizing signals.

As shown in dotted lines in Fig. 3 the interrupting system of Fig. 1 may be combined with the tuned oscillator, whereby the action would still more be improved. In 29 the interrupting system has been shown; it acts in the same manner as the system 6 of Fig. 1. In Fig. 3 the interrupter is shown controlled by the oscillator 28; it will be evident that an analogous effect may be obtained by having it under control of the relaxation system 26.

Fig. 5 shows the action of a system as indicated in dotted lines in Fig. 3.

Fig. 5a shows, on a time base, the effective value of the carrier transmitted by the emitter.

The detected current curves and the curves showing the synchronizing impulses are analogous to the curves 2b and 2c; they have not been shown in Fig. 5.

Fig. 5d represents the alternating voltage supplied by the oscillator tuned to the synchronizing frequency and which acts on the interrupting system. It corresponds to the oscillator voltage, but displaced with respect to the axis.

Fig. 5e shows the intensity of the plate current flowing in the valve (system 29), which ensures the junction between the amplifier 24 and the oscillator 28.

During the negative wave half 20 the oscillator blocks the valve 29 and isolates the relaxation system. During the positive wave halves a certain current flows in the valve, it becomes conducting and transmits the synchronizing impulses.

Fig. 5f shows the synchronizing signals transmitted to the relaxation system 26 by the oscillator 28. In Fig. 5 the same reference numerals have been used as in Fig. 2. It is seen that the parasite 18″ remaining in the curve 2c is definitely eliminated in curve 5f. The oscillator therefore ensures a control analogous to that of the relaxation system as described, but with better stability.

A remarkable advantage of the novel automatic sensitizing of the system transmitting the synchronizing signal resides in the fact that synchronizing signals may be used, which have a different form as compared to the signals actually in use. In particular an amplitude or a shape may be given to the signal which are of the same order as those of the modulation pertaining to the image. As a result the invention allows the use of a novel modulation system at the emitter, which system is simpler and more economical than those actually used. Up till now it has been necessary in order to effect the separation of the synchronizing signals from the received signal to have the amplitude of the synchronizing signal in the positive or negative sense differing considerably from the amplitude of modulation of the image signals (case of Figs. 2a and 5a). The oscillator efficiency was low because during the greater part of the time the emitter could not be usefully modulated up to 100% by the image, a considerable margin having to be provided for the synchronization impulses. An interesting consequence of the invention resides in the following points; as the tuned oscillator in the receiver becomes automatically very sensitive to the synchronizing signal during a small fraction of its own frequency, synchronizing signals may be used which have the same amplitude as the modulation signals. There is no risk of the latter disturbing the synchronizing system, because at the moment of their transmission the valve oscillator is insensible.

Fig. 6 illustrates the shape of the modulation when according to the invention a synchronizing signal is used the amplitude of which is of the same order as that of the image transmissions.

Fig. 6a shows on a time base the effective value of the carrier emitted by the transmitter.

Fig. 6b shows on a time base the value of the detected current transmitted to the control grid of the cathode ray tube.

Fig. 6d shows the alternating voltage supplied by the tuned oscillator.

Fig. 6e shows the intensity of the current flowing in the valve 29 ensuring the junction between the amplifier 24 and the oscillator 28.

Fig. 6f shows the synchronizing signals arriving at the relaxation system.

The application of the action described will appear from Figs. 2 or 5, the reference numerals having been retained; the shape and the amplitude of the synchronization signal only have been modified. It is seen that a signal of small amplitude (68%), transmitted during a very small fraction of the period, to ensure the maintenance of the local oscillator to the scanning frequency of the transmitter. From Fig. 6a it is seen that the transmitting efficiency is considerably increased, the emitter being modulated to 100% by the image currents. The synchronizing signals 30 and 31 fall in the periods 34 and 35 in which the interrupting system 29 is conducting. The impulses arriving at the relaxation system are shaped as at 36 and 37, to which are added the image elements 38, 39, 40 and 41. Thanks to the shape of the curves 34, 35 these image elements are prevented from reaching the synchronizing system, the discriminator being thereby permitted to select the synchronizing signals.

The interrupting system which was controlled in the examples given by the relaxation system or by the oscillator may also be controlled by the electron beam in the cathode ray tube, this feature likewise being a part of the invention. To this end a plate fixed to one of the sides of the fluorescent screen (internally or externally of the tube) or a photo-electric cell is used in combination with this screen. In the first case the plate will receive an electric impulse every time it is struck by the electron beam modulated by the synchronization signal, in the second case the cell is preferably disposed in front of the lateral part of the screen not used for image transmission. The voltage developed on one or the other of these systems is used for influencing the conductibility of the interrupting system 29. In certain cases it would be possible to control by this developed voltage the grid voltage of the thyratron serving to effect the condenser discharge, instead of having it act on the interrupting system, without departing from the scope of the invention, which bears on improvements in synchronization.

The interruption system introduced according to the invention in the amplifier output may be realised in a great variety of manners. Purely by way of example Fig. 7 shows the use of a multi-grid valve effecting the blocking action, the signal selection and the automatic stabilisation of the oscillator tuned to the synchronization signals. This figure shows by way of example and in order to make clear the ease with which the invention may be carried into effect, a thyratron relaxation system as frequently used in present-day receivers.

The deflection plate 42 of the oscillograph is connected to the plate 45 of a rarefied gas discharge tube (Thyratron) and the plate 43 is connected to a sliding contact of a potentiometer 46. The plate 45 is connected on the one hand to the condenser 47 and on the other hand to a variable resistance 48; the Thyratron grid 49 suitably biased by the battery 50 is connected to a slide contact on the potentiometer 51. This connection contains the secondary of a transformer 152 generally receiving the synchronization impulses from the discriminator. It is known that a rarefied gas tube, connected as shown to a condenser and resistance combination will generate a periodic relaxation i. e. the condenser 47 will discharge suddenly and with regular intervals and then recharges slowly due to the high resistance 48. Between the plates 42 and 43 a voltage is obtained which may be represented on a time base as a saw tooth curve and which is very suitable for supplying to the oscillograph deflecting plates. The synchronizing signal is transmitted by a valve 59 connected to a circuit tuned to the synchronization frequency and acting as local oscillator. Preferably a multi-grid valve is used, every grid influencing the electron stream; the synchronization to the received signals is thereby facilitated. The hexode valve shown in Fig. 7 is particularly suitable; the grids 52 and 53 form a local oscillator together with the oscillating circuit 54 and 55, the frequency of this oscillator being very near to the line or image frequency. The grid 53 acts as first anode, the electronic flux from the cathode being controlled by the grid 52. An auxiliary grid 56 is placed close to the cathode. This grid receives the modulation from the amplifier 57 connected to the antenna-ground system 58 of the receiver.

The plate of the valve 59 supplies a current which according to the curves shown in Figs. 5e or 6e (shadowed part) can only flow during a very small fraction of the period.

The periodical variation of the conductibility of the valve 59 has for its consequence that transmission between the circuit parts 57 and 52 is only possible near the moments at which the synchronizing signals occur.

It is to be understood that no limitation is intended by the description of specific embodiments, which have only been given by way of example and without intention of restricting the invention; consequently any modifications having the same object as the apparatus described must be considered as falling within the scope of the invention as defined in the appended claims.

I claim:

1. In a television receiver, the combination of means for receiving both the modulation and the synchronizing signals, means for selecting the synchronizing impulses from said modulation and synchronizing signals, transmission means interposed between said receiving means and said selecting means, a sawtooth oscillator, auxiliary means including an independent oscillator for periodically varying the transmission characteristics of said transmission means to pass synchronizing impulses only during predetermined time intervals, and means to synchronize the sawtooth oscillator by the passed synchronizing signals.

2. In a television receiver, the combination of means for receiving both the modulation and the synchronizing signals, means for selecting the synchronizing impulses from said modulation and synchronizing signals, a sawtooth oscillator, a connection between said receiving means and said selecting means, transmission means inserted in said connection, and independent oscillator means for controlling the transmission characteristics of said transmission means in accordance with the time occurrence of said synchronizing signals.

3. In a television receiver, the combination of means for receiving both the modulation and the synchronizing signals, as oscillator to be synchronized, a transmission path between the receiving means and the oscillator, and an independent auxiliary oscillator for periodically decreasing the conductivity of said transmission path substantially in the time interval between said synchronizing signals.

4. In a television receiver the combination of an antenna, an amplifier connected therewith, a discriminator fed from said amplifier and a relaxation oscillator controlled by said discriminator, with means controlled by said oscillator for periodically passing impulses from said amplifier to said discriminator only during time coincidence of oscillations of the said oscillator and impulses from said amplifier.

5. In a television receiver, the combination of an antenna, an amplifier connected therewith, a discriminator fed from said amplifier and a relaxation oscillator controlled by said discriminator, a variable transmission path between said amplifier and said discriminator, and means controlled from said oscillator for periodically varying the transmission power of said path in substantially exact relation to said synchronizing signals.

6. In a television receiver, the combination of an antenna, an amplifier fed thereby, a discriminator fed from said amplifier, a Thyratron controlled by said discriminator, a cathode ray tube controlled by said amplifier and influenced by said Thyratron, and a transmission path controlled by said Thyratron interposed between said amplifier and said discriminator for periodically interrupting transmission from said amplifier to said discriminator.

7. In a television receiver, the combination of an antenna, an amplifier fed thereby, a relaxation oscillator, and an auxiliary oscillator between said amplifier and said relaxation oscillator, said auxiliary oscillator having a period very close to that of the synchronizing signals and being adapted to correct the signals supplied to said relaxation oscillator.

8. In a television receiver the combination of an antenna, an amplifier fed thereby, a Thyratron and an oscillator between said amplifier and said Thyratron, said oscillator comprising a multi-electrode valve, a grid of said valve being adapted to receive the synchronizing impulses, and said oscillator being adapted to influence the control grid of said Thyratron and to correct the signals supplied to said oscillator.

9. In a television receiver, the combination of an antenna, an amplifier fed thereby, a relaxation oscillator, an auxiliary oscillator between said amplifier and said relaxation oscillator, said auxiliary oscillator being influenced by synchronizing signals, and electronic means interposed between said amplifier and said auxiliary oscillator for periodically interrupting impulses from said amplifier substantially between said synchronizing signals.

10. In a television receiver, the combination of an antenna, an amplifier fed thereby, a relaxation oscillator, an auxiliary oscillator between said amplifier and said relaxation oscillator, said auxiliary oscillator being influenced by synchronizing signals, and an electronic transmission path controlled by said auxiliary oscillator for permitting the transmission of impulses from said amplifier in substantial coincidence with said synchronizing signals and suppressing such transmission between said signals.

11. In a method of television reception, receiving impulses, amplifying said impulses, transmitting said amplified impulses, generating saw-tooth oscillations, independently generating auxiliary oscillations, and periodically suppressing the transmission of said amplified impulses under the control of the independently generated oscillations and synchronizing the generated sawtooth oscillations by the unsuppressed oscillations.

12. In a method of television reception, receiving modulation and synchronizing signals, amplifying said signals, generating saw-tooth oscillations to be synchronized, transmitting said signals to control the frequency of the generated saw-tooth oscillations, selecting periodic synchronizing signals under the control of independently generated oscillations, varying the said transmission of signals and providing maximum transmission periodically in time coincidence with the received synchronizing signals and the independently generated oscillations.

13. In a television receiver system, the steps in the method of synchronizing the receiver which comprises receiving synchronizing signals, generating oscillations to be synchronized by the received synchronizing signals, producing auxiliary oscillations, comparing the received synchronizing signals with the produced auxiliary oscillations, and synchronizing the generated oscillations by the received synchronizing signals only during time coincidence of the auxiliary oscillations and the received synchronizing signals.

14. A television receiver system comprising means for receiving synchronizing signals, means for generating oscillations to be synchronized by the received synchronizing signals, means for producing auxiliary oscillations, means for comparing the received synchronizing signals and the produced auxiliary oscillations, and means for synchronizing the generated oscillations by the received synchronizing signals only during time coincidence of the auxiliary oscillations and the received synchronizing signals.

PIERRE MARIE GABRIEL TOULON.